Patented Aug. 23, 1938

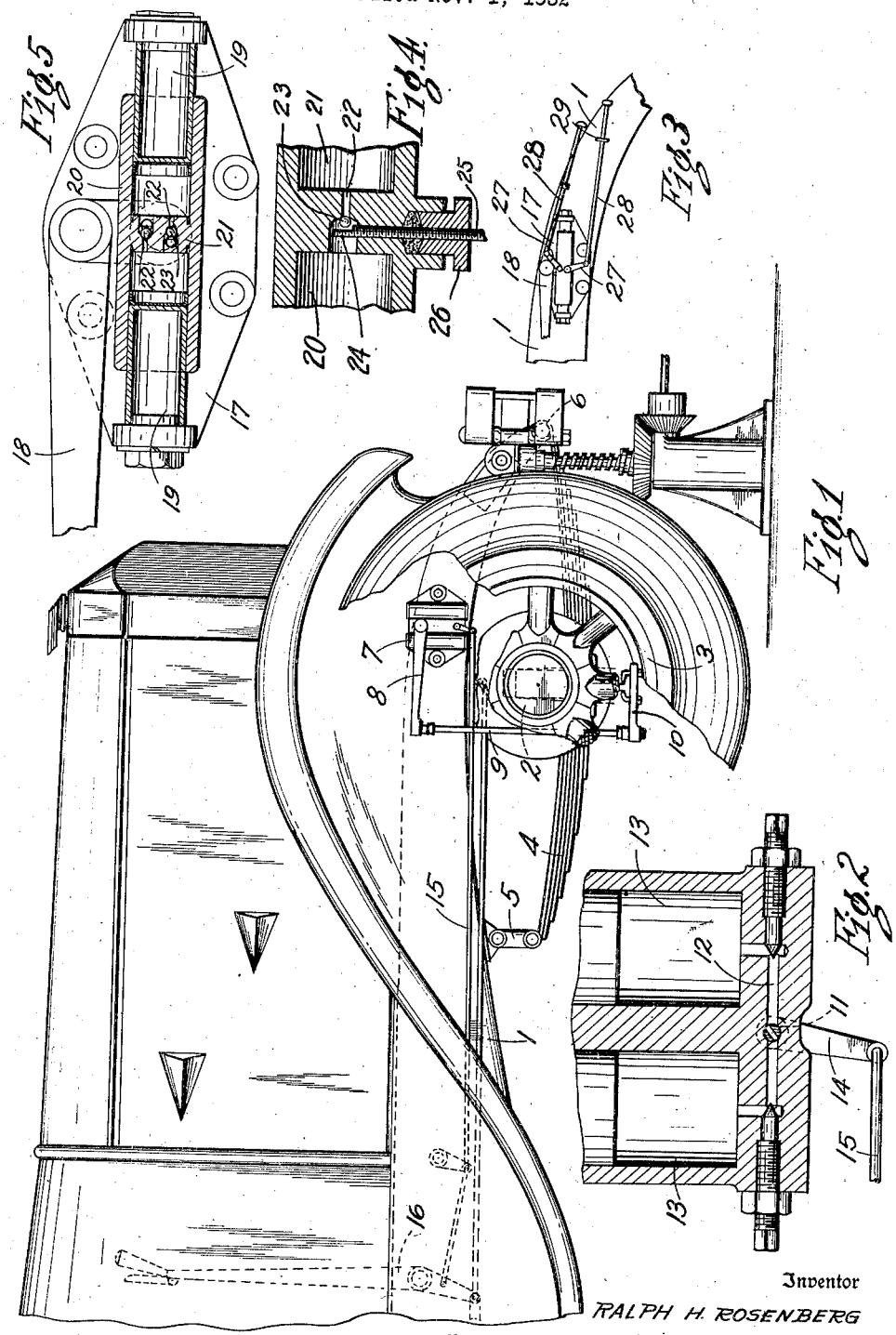

2,127,755

UNITED STATES PATENT OFFICE 2,127,755

HYDRAULIC LOCK FOR VEHICLE SPRINGS

Ralph H. Rosenberg, Grosse Pointe, Mich., assignor to Bendix Products Corporation, South Bend, Ind., a corporation of Indiana Application November 1, 1932, Serial No. 640,626

2 Claims. (Cl. 188—2)

This invention relates to an improvement in shock absorbers for locking the shock absorber so as to hold the spring and axle of a vehicle against relative movement with respect to the frame thereof.

In servicing the tires and wheels of an automobile or like vehicle it is difficult and cumbersome to arrange a jack beneath the axle of the vehicle as is the usual practice. Also where tires of the large balloon type, recently introduced on the market for use on automobiles, are used and where such a tire becomes deflated the axle approaches so closely to the ground it is impossible to use an ordinary jack and difficult to use a specially constructed jack for lifting the axle and wheel in the usual manner.

It is the object of this invention to provide means for holding the spring, wheel, and axle assembly of an automobile against relative movement with respect to the frame of the vehicle so that by applying a jack or similar lifting device to any convenient point on the frame of the vehicle, adjacent the wheel to be lifted, the frame, spring, axle and wheel may be lifted as a unit. More specifically it is an object of this invention to provide an improvement in shock absorbers of the hydraulic type by which the shock absorber and the parts associated therewith may be locked against relative movement. Other objects and advantages in the present invention will appear in the following detailed description taken in connection with the accompanying drawing in which:

Fig. 1 is a view in side elevation partly broken away of a portion of an automobile carrying a hydraulic shock absorber to which this invention has been applied.

Fig. 2 is a detail view in cross section of a portion of a shock absorber showing a construction by which the shock absorber may be locked.

Fig. 3 is a fragmentary view in side elevation showing a modified form of the invention.

Figs. 4 and 5 are detail views in section of the modified form of the invention illustrated in Fig. 3.

As shown in Fig. 1, the automobile or other vehicle is provided with the frame 1, an axle 2, supporting wheels 3 which axle is connected with the frame by spring 4 through the shackles 5 and 6. The shock absorber 7 of the hydraulic type is supported by and suitably fastened to the frame of the vehicle and the arm 8 of the shock absorber is connected by the link 9 and plate 10 to the axle of the vehicle. It will be understood that a strap connection may be used in place of the rigid link 9 although if a strap is used it will only be possible to lock the axle and frame against relative separation. As is well known the axle and wheel assembly may move relative to the vehicle under the restraining force of the spring 4 and shock absorber 7.

In order to lock, or otherwise secure, the axle and frame of the vehicle against relative separation, or other relative movement, so that the axle and wheel assembly may be lifted by lifting the frame, it is convenient to provide means applied to the shock absorber for preventing movement thereof, thus preventing relative separation between the frame and axle as the frame is lifted. While various devices for locking the shock absorber against movement may be employed within the purview of this invention, a convenient form of locking device is that illustrated in Fig. 2 which consists of a valve 11 arranged in the passage 12 connecting the cylinders 13 of the shock absorber. As is well known, a restricted flow of fluid through the passage 12 from one cylinder 13 to the other takes place in the normal operation of the shock absorber. By arranging the valve 11 in the passage 12, which valve may be turned to completely shut off the passage 12 so as to prevent flow of fluid therethrough, movement of the shock absorber may be prevented. For operating the valve 11, it may have a stem extending exteriorly of the shock absorber housing upon which an arm or crank 14 may be mounted rigidly. Any convenient means for operating the valve 11 may be provided such as the link 15 Figs. 1 and 2 leading to the emergency brake lever 16 or other suitable lever mounted in a convenient place on the vehicle, as in the operator's compartment. Thus in the form of the invention illustrated in Fig. 1 whenever the emergency brake is operated to apply the brakes the shock absorbers will lock throughout the car for preventing relative separation between the axle and the frame of the vehicle.

In the form of the invention illustrated in Figs. 3, 4 and 5 a conventional type of shock absorber 17 is mounted upon the frame 1 of the vehicle in any suitable manner. The shock absorber 17 is provided with the bell crank 18 which is connected to the axle or spring of the vehicle in a conventional manner, and has its other arm operatively associated with the shock absorber as illustrated in Fig. 1. As shown more in detail in Fig. 5, the shock absorber 17 is provided with fixed pistons 19 mounted in any suitable manner on the base of the shock absorber. A cylinder 20 receives the ends of the fixed pistons 19 and is slidable thereon. Centrally of the cylinder 20 is a web 21 closing the bore, there being passages 22 drilled therethrough to permit the flow of fluid from one side to the other of the web or partition 21, as the cylinder 20 is moved relative to the pistons 19, in use. Valves, which may be of the ball type, are arranged to close passages 22 to the flow of fluid in one direction. The passages 22 in the ball valves 23 are arranged so that, in the normal operation of the shock absorber, a flow of fluid from one side of the piston 21 will take place through one of the passages 22 to the other side of the partition while the return flow of the fluid in the other direction, will occur through the other of the passages 22. In order to retain the ball valves 23 in operative position blocks 24 are arranged adjacent thereto but spaced from the ball valves a sufficient distance to permit movement of the balls toward and away from the passages 22. In the present form of the invention the blocks 24 may be carried on and form a part of the screws 25 threaded into the partition 21, there being suitable packing means 26 about the screws 25.

As shown in Figs. 4 and 5 of the drawing, by turning either or both of the screws 25 the ball valves 22 may be jammed against the valve seat into which the passages 22 lead, thereby preventing flow of fluid through such passages. The crank arms 27 are provided on the shafts 25 to facilitate operation thereof. Rods 28 may be connected with the ends of cranks 27, said rods being supported by rings 29 secured in the frame of the vehicle through which ring the rods 28 may slide freely. During a normal operation of the shock absorber illustrated in Figs. 3, 4 and 5 the blocks or ends of the screws 25 are in the position illustrated in Figs. 4 and 5 so that normal operation of the shock absorber can take place. Movement of the cylinder 20, during normal operation of the shock absorber, carries with it the pins 24 and cranks 27, the rods 28 sliding freely in the loops 29 so as not to operate the cranks 27 as the cylinder 20 slides back and forth. When it is desired to lock the wheel, spring and axle assembly to the frame of the vehicle, the cranks 27 may be manipulated conveniently through the rods 28, to close one or both of the passages 22 so that flow of fluid past the partition 21 in one direction or in both directions is prevented. Thus separation between the wheel, spring and axle assembly and the frame may be prevented, or all motion of the axle assembly either toward or away from the frame may be prevented, by the use of the invention illustrated in Figs. 3, 4 and 5.

While certain forms of the invention have been described in detail by way of illustration it is not intended so to limit the invention inasmuch as the modifications in the details of construction and the arrangement of the parts thereof may be made without departing from the spirit and scope of the invention as defined in the following claims.

What I claim is:

1. In combination, a vehicle frame, springs connected therewith, axle and wheel assemblies connected with the springs, shock absorbers mounted on the frame adjacent to each wheel and connected with the axle, a brake system for the wheels, and means connected with and operable upon operation of the brake system for locking the shock absorbers against substantial movement.

2. A hydraulic shock absorber for a vehicle having a braking system actuated by a brake lever, comprising, in combination, means for circulating fluid within the shock absorber; means for controlling said fluid circulation; and means actuated by the brake lever for rendering effective only certain of said controlling means during the application of braking forces.

RALPH H. ROSENBERG.